(12) United States Patent
Wu

(10) Patent No.: US 9,851,627 B2
(45) Date of Patent: Dec. 26, 2017

(54) OPTICAL ENGINE AND PROJECTOR WITH SAME

(71) Applicant: HON HAI PRECISION INDUSTRY CO., LTD., New Taipei (TW)

(72) Inventor: Jing-Miau Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 16 days.

(21) Appl. No.: 14/886,264

(22) Filed: Oct. 19, 2015

(65) Prior Publication Data

US 2017/0059978 A1 Mar. 2, 2017

(30) Foreign Application Priority Data

Aug. 27, 2015 (CN) .......................... 2015 1 0533723

(51) Int. Cl.
*G03B 21/16* (2006.01)
*G03B 21/14* (2006.01)
*G03B 21/20* (2006.01)
*G03B 33/08* (2006.01)
*G02B 26/00* (2006.01)

(52) U.S. Cl.
CPC ........... *G03B 21/16* (2013.01); *G03B 21/145* (2013.01); *G03B 21/20* (2013.01); *G03B 33/08* (2013.01); *G02B 26/008* (2013.01)

(58) Field of Classification Search
CPC .. G03B 21/2093; G03B 21/145; G03B 21/16; G03B 21/204; G02B 26/008
USPC ............................................................ 353/52
See application file for complete search history.

(56) References Cited

U.S. PATENT DOCUMENTS

2014/0375964 A1* 12/2014 Tsuchiya .............. H04N 9/3144
353/52

FOREIGN PATENT DOCUMENTS

TW 200916939 A 4/2009
TW 201229651 A1 7/2012

* cited by examiner

*Primary Examiner* — Steven H Whitesell Gordon
*Assistant Examiner* — Jerry Brooks
(74) *Attorney, Agent, or Firm* — ScienBiziP, P.C.

(57) ABSTRACT

An optical engine of a projector can include a light source device configured to emit light beam, an engine body and a dust cover. The engine body is located at a side of the light source device and is configured to receive the light beam from the light source device. The engine body can include a main body and a color wheel coupled to the main body. The dust cover is coupled to the engine body and covers the color wheel. A projector is also provided.

12 Claims, 6 Drawing Sheets

OPTICAL ENGINE AND PROJECTOR WITH SAME

FIELD

The subject matter herein generally relates to projection technology, and particularly to an optical engine and a projector with the optical engine.

BACKGROUND

A projector generally includes an optical engine which includes a color wheel and a light channel. Dust will enter into the color wheel when the projector is used in a dust environment.

BRIEF DESCRIPTION OF THE DRAWINGS

Implementations of the present technology will now be described, by way of example only, with reference to the attached figures.

DETAILED DESCRIPTION

Figure 1:
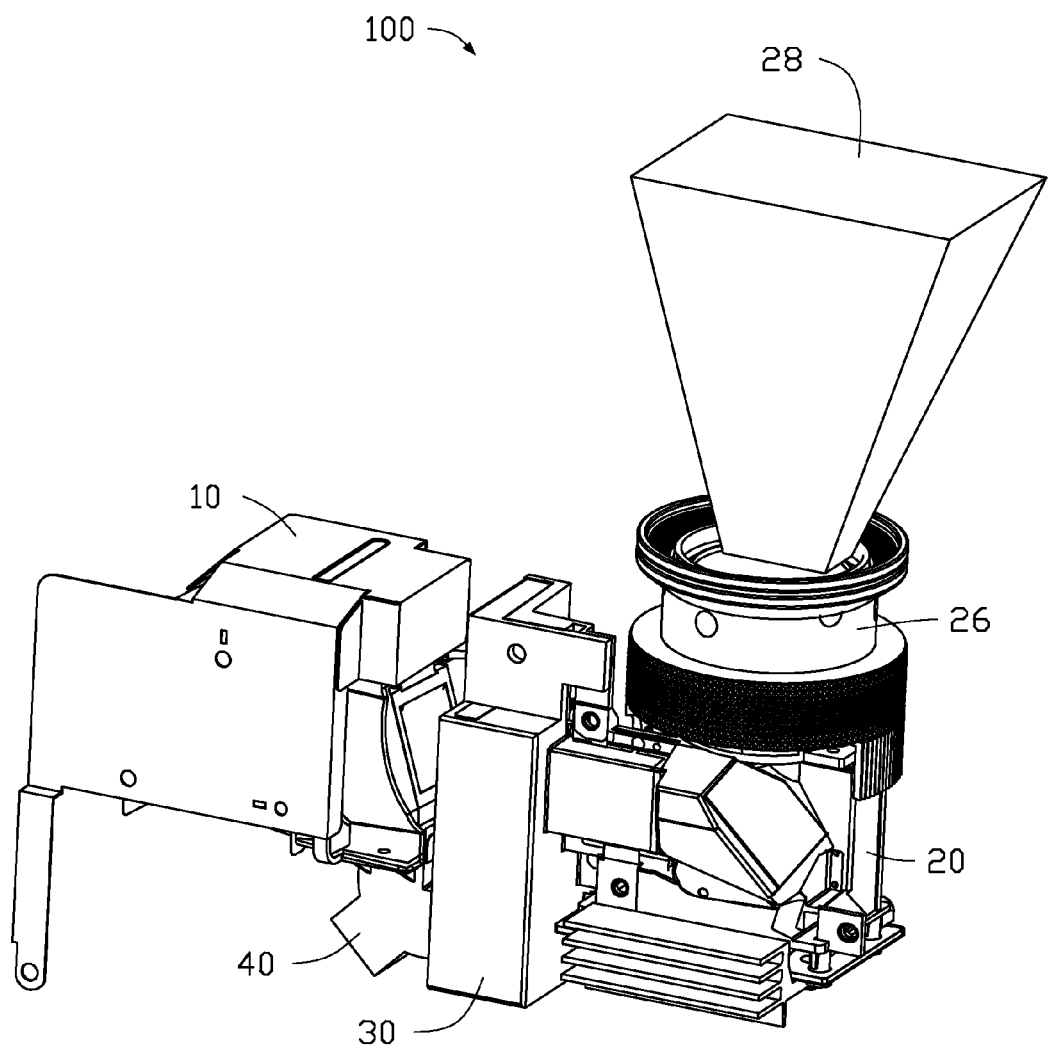
FIG. 1 is an isometric view of an optical engine of a projector with a screen in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an optical engine. The optical engine can include a light source device configured to emit light beam, an engine body and a dust cover. The engine body is located at a side of the light source device and is configured to receive the light beam from the light source device. The engine body can include a main body and a color wheel coupled to the main body. The dust cover is coupled to the engine body and covers the color wheel.

The present disclosure is described further in relation to a projector. The projector can include a light source device configured to emit light beam, an engine body and a dust cover. The engine body is configured to receive the light beam from the light source device. The engine body can include a main body, a color wheel coupled to the main body and a light channel coupled to the main body and adjacent the color wheel. The dust cover coupled to the engine body and covering the color wheel and the light channel.

FIG. 1 illustrates that an optical engine 100 of a projector can include light source device 10, an engine body 20, a dust cover 30 and a heat dissipating duct 40. The engine body is located at a side of the light source device 10 and is configured to receive light beam from the light source device 10. The dust cover 30 is coupled to the engine body 20. The heat dissipating duct 40 is coupled between the light source device 10 and the dust cover 30. The optical engine 100 is configured to project images onto a screen 28.

Figure 2:
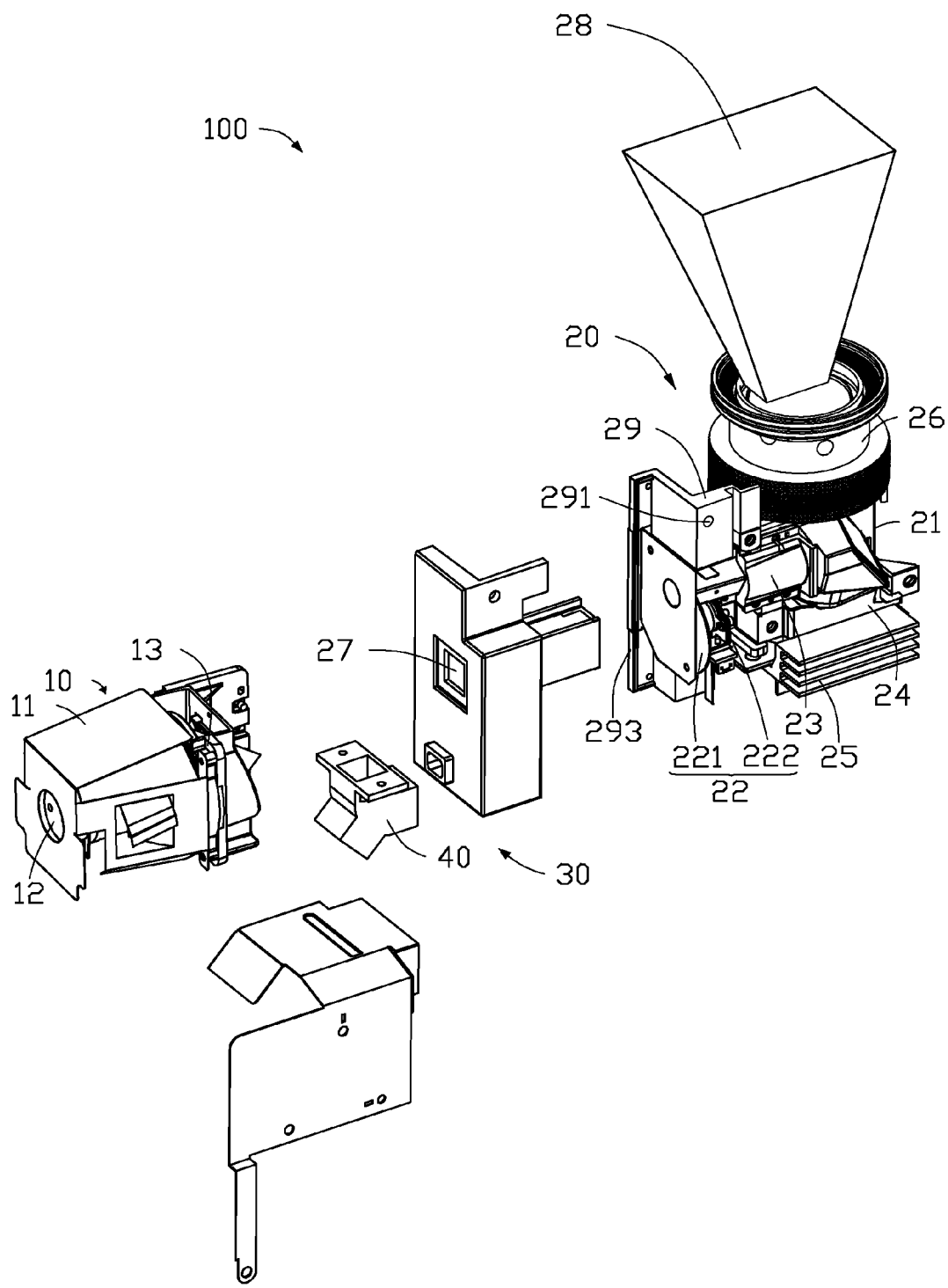
FIG. 2 is a partially exploded view of the optical engine with the screen in FIG. 1.

FIG. 2 illustrates that the light source device 10 is configured to emit white light beam, the white light beam can be convergent and with high brightness. The light source device 10 can include a shell 11, a light source 12 and a converging lens 13 held by the shell 11. The shell 11 is configured to protect the light source 12 and the converging lens 13. The light source 12 and a converging lens 13 are received in the shell 11.

The shell 11 can include a heat dissipation window coupled to the heat dissipating duct 40.

The light source 12 is configured to emit white light. The light source 12 can be a high pressure mercury lamp, metal halide lamp, xenon lights, laser or light emitting diode (LED) or other light sources. In the illustrated embodiment, the light source 12 is a high pressure mercury lamp.

The converging lens 13 is located adjacent to the engine body 20, and configured to converge the white light from the light source 12 to be the white light beam. The converging lens 13 can be replaced by a filter lens, which is configured to filter ultraviolet and infrared light. The converging lens 13 also can have functions of a filter lens.

The engine body 20 is located adjacent the light source device 10. The engine body 20 can include a main body 21, a color wheel 22, a light channel 23, a digital micromirror device 24, a heat dissipating member 25 and a projecting lens 26. Each of the color wheel 22, the light channel 23, the digital micromirror device 24, the heat dissipating member 25 and the projecting lens 26 is coupled to the main body 21.

The color wheel 22 is located between the light source device 10 and the light channel 23. The color wheel 22 is configured to split the white light beam from the light source device 10 and produce sequential lights. The color wheel 22 can include a color film 221, a motor 222 coupled to the color film 221. The color film 221 can include a plurality of color regions of red, green, blue, white, yellow, purple, indigo or other colors. The color film 221 can rotate by drive of the motor 222, to split the white light beam from the light source device 10.

The engine body 20 can further include a light filter 27 located between the converging lens 13 and the color film 221. The light filter 27 can be an ultraviolet and infrared filter, or an antireflective film with a high penetration rate.

The light filter 27 is configured to ensure sealing of the optical engine 100 and reduce attenuation of the light in the optical engine 100.

The light channel 23 is located on a path of emergent lights from the color film 221. The light channel 23 is configured to guide the sequential lights split by the color wheel 22 to the digital micromirror device 24. The light channel 23 is coupled to the main body 21 and has a portion thereof exposed out of the main body 21.

The digital micromirror device 24 is located on a path of emergent lights from the light channel 23. The digital micromirror device 24 is configured to modulate the sequential lights from the color wheel 22 according to external input signals, to produce projected images. The digital micromirror device 24 can include a silicon substrate and a plurality of memories made by large scale integrated circuit technology on the substrate. Each memory has two addressing electrodes and two landing electrodes. The digital micromirror device 24 further includes a micromirror unit coupled on the substrate. The micromirror unit includes one or a plurality of micromirrors coupled to two shores on the substrate by torsion hinges. In use, the digital micromirror device 24 is driven by video signals. According to included angle between incident lights and optical axis of an optical system, the micromirrors rotate about the torsion hinges until reach the landing electrodes under a differential voltage of the two addressing electrodes, to thereby form a switch of the micromirror unit, to load image information.

The heat dissipating member 25 is configured to dissipate heat from the digital micromirror device 24.

The projecting lens 26 is located on a path of emergent lights from the digital micromirror device 24. The projecting lens 26 is configured to enlarge the projected images from the digital micromirror device 24, and project the projected images onto the screen 28.

The engine body 20 can further include a position body 29 coupled to the main body 21 and adjacent to the color wheel 22. The position body 29 is configured to position the dust cover 30. The position body 29 is located between the color wheel 22 and the light source device 10. The position body 29 can include a position hole 291 and a rib 293 configured to couple with the dust cover 30.

Figure 3:
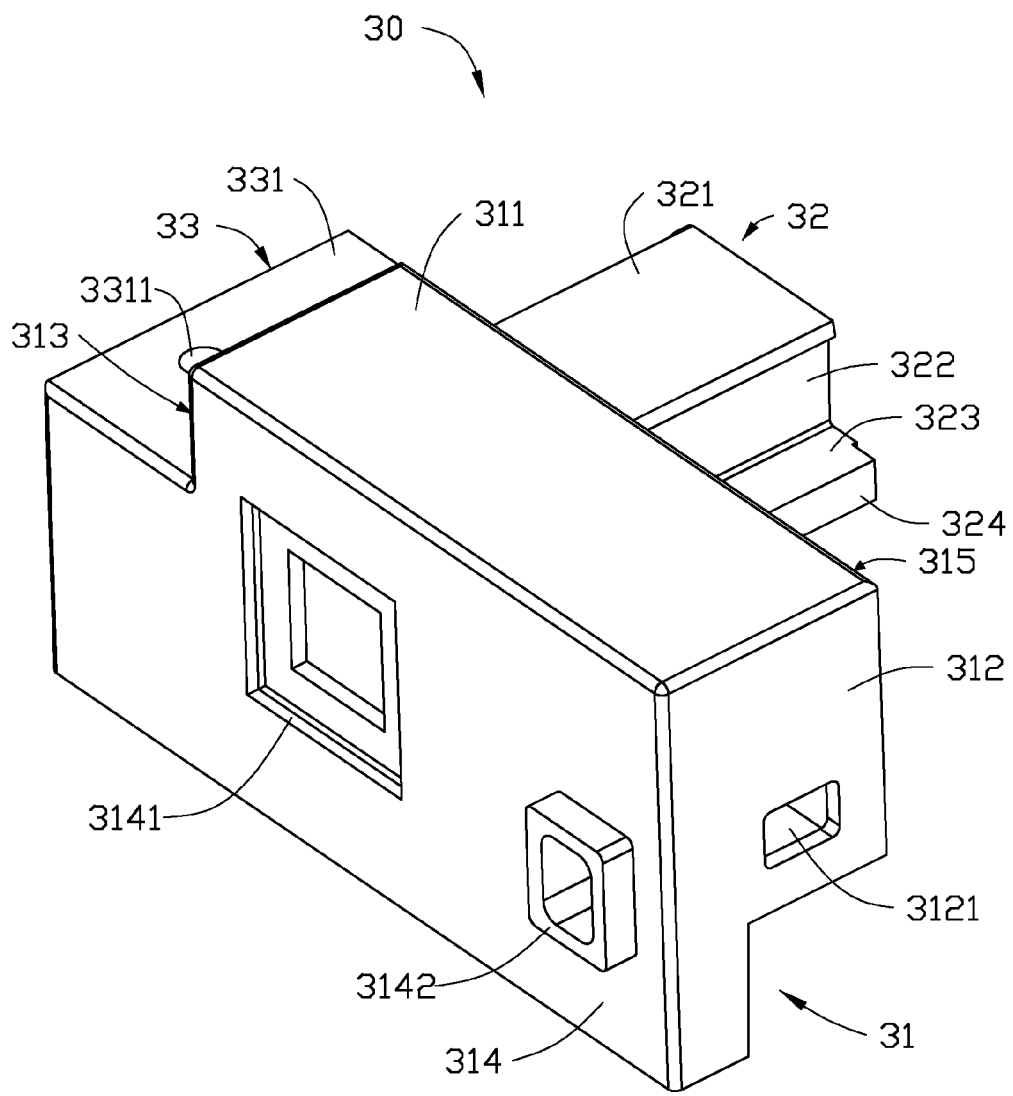
FIG. 3 is an isometric view of a dust cover of the optical engine in FIG. 2.

FIG. 3 illustrates that the dust cover 30 includes a main portion 31, an extension portion 32 extending from the main portion 31 and a locating portion 33. The dust cover 30 can be a single piece. The main portion 31 and the extension portion 32 are an integral one. In at least one embodiment, the main portion 31 and the extension portion 32 and the locating portion 33 are an integral one.

Figure 4:
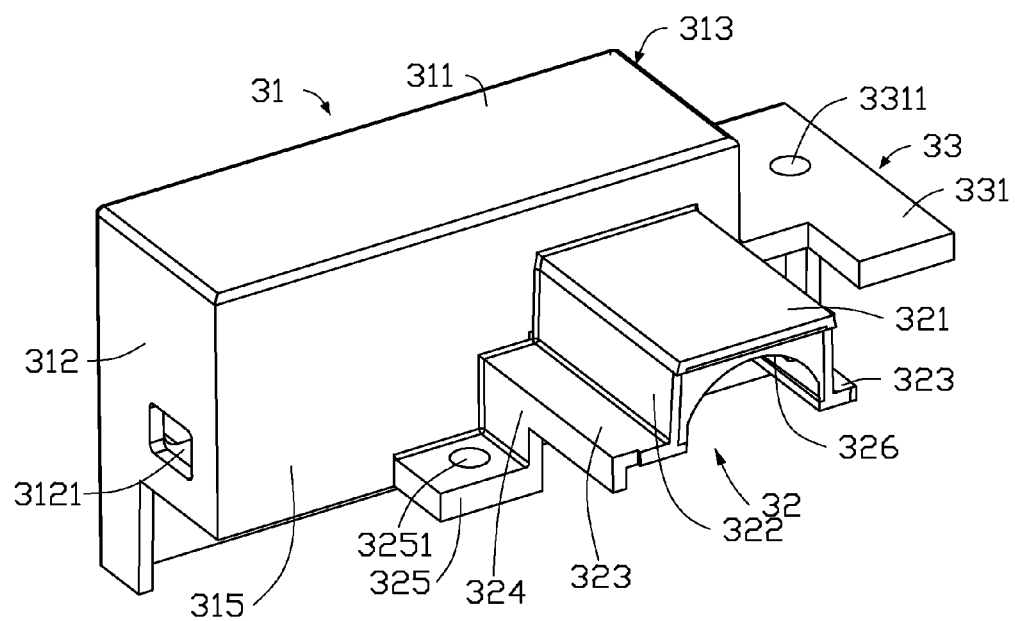
FIG. 4 is an isometric view of the dust cover in FIG. 3 viewed from a different aspect.

The main portion 31 can include a first ceiling 311, a first sidewall 312 extending from the first ceiling 311, a second sidewall 313 extending from the first ceiling 311, a third sidewall 314 extending from the first ceiling 311, and a fourth sidewall 315 extending from the first ceiling 311. In at least one embodiment, each of the first sidewall 312, the second sidewall 313, the third sidewall 314 and the fourth sidewall 315 are substantially perpendicular to the first ceiling 311. The first sidewall 312 is parallel and opposite to the second sidewall 313. The third sidewall 314 is parallel and opposite to the fourth sidewall 315. The first sidewall 312 and the second sidewall 313 each are perpendicularly coupled to the third sidewall 314 and the fourth sidewall 315. FIG. 4 illustrates that the extension portion 32 extends from the fourth sidewall 315. A first step is formed between the first ceiling 311 and the extension portion 32. The locating portion 33 extends from the second sidewall 313. A second step is formed between the first ceiling 311 and the locating portion 33.

The first sidewall 312 defines a line export 3121 extending through the first sidewall 312. The line export 3121 is configured to collect lines in the optical engine 100.

The third sidewall 314 defines a first opening 3141 and a second opening 3142 each extending through the third sidewall 314. The first opening 3141 is configured to receive the light filter 27. The first opening 3141 faces the converging lens 13, so that the white light beam form the converging lens 13 can reach the first opening 3141. The second opening 3142 is configured to receive the heat dissipating duct 40. The first opening 3141 can have a size larger than the second opening 3142.

Figure 5:
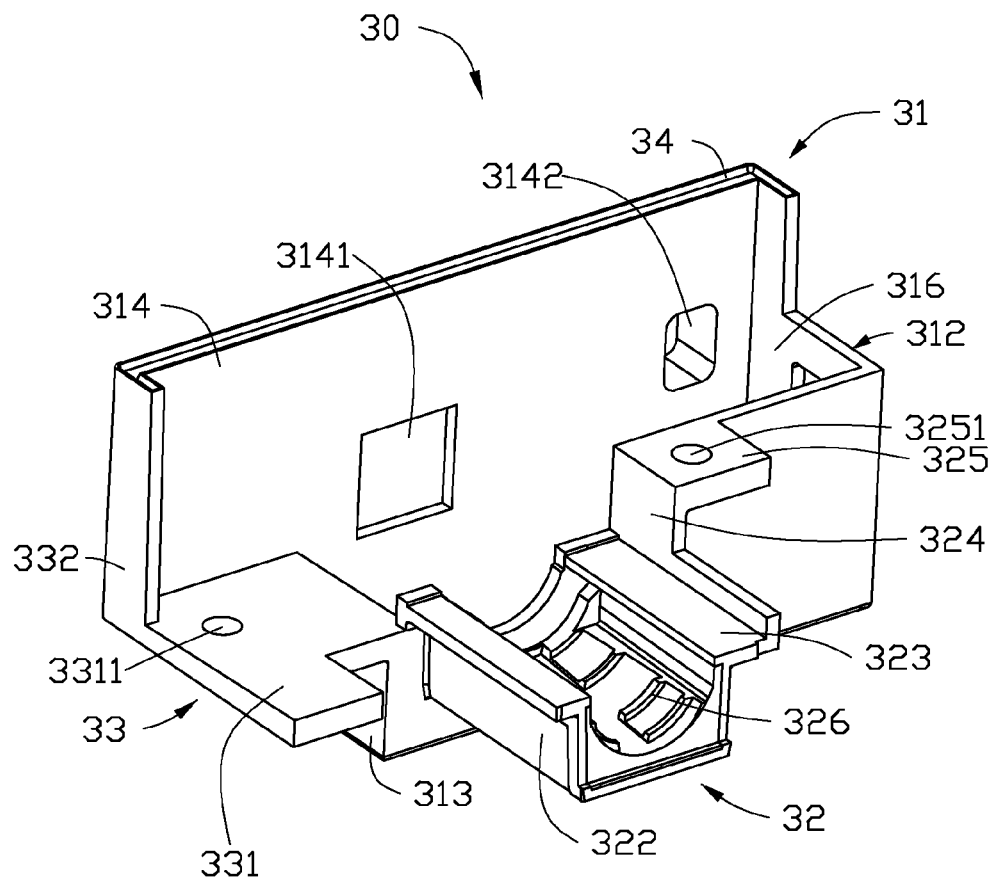
FIG. 5 is an isometric view of the dust cover in FIG. 3 viewed from a different aspect.

FIG. 5 illustrates that the main portion 31 can further include a receiving space 316 surrounded by the first ceiling 311, the first sidewall 312, the second sidewall 313, the third sidewall 314 and the fourth sidewall 315. The receiving space 316 is configured to receive the color wheel 22.

FIG. 4 illustrates that the extension portion 32 can include a second ceiling 321, two opposite sidewalls 322 extending from the second ceiling 321, two opposite abutting parts 323 respectively extending from the two sidewalls 322, a coupling part 324 extending from one of the abutting parts 323, and a locating block 325 extending from the coupling part 324. The second ceiling 321 is located below the first ceiling 311. The first step is formed by the second ceiling 321 and the first ceiling 311. The second ceiling 321, the abutting parts 323 and the locating block 325 can be parallel to each other. The second ceiling 321, a corresponding sidewall 322, a corresponding abutting part 323, the coupling part 324 and the locating block 325 can collectively form a steps-configuration. The two abutting parts 323 are located at two opposite sides of the two sidewalls 322. In at least one embodiment, the sidewall 322 is perpendicular to the second ceiling 321, the abutting parts 323 and the locating block 325. The sidewall 322 can be parallel to the coupling part 324. Each of the abutting parts 323 is adjacent to the corresponding sidewall 322. The locating block 325 is remote from the corresponding sidewall 322. In at least one embodiment, each of the second ceiling 321, the sidewalls 322, the abutting parts 323, the coupling part 324 and the locating block 325 are in directly contact with the fourth sidewall 315.

The locating block 325 defines a locating aperture 3251 configured to receive a fastener to couple the extension portion 32 to the main body 21.

The extension portion 32 can further include a receiving room 326 cooperatively defined by the sidewalls 322 and the second ceiling 321. The receiving room 326 is configured to receive the light channel 32. In the illustrated embodiment, the receiving room 326 is in a shape of semi-cylinder, which matches with the portion of the light channel 32 exposed out of the main body 21.

FIG. 5 illustrates that the locating part 33 can include a third ceiling 331 and a wall 332 extending from the third ceiling 331. The wall 332 can be perpendicular to the third ceiling 331. The wall 332 is opposite to the first sidewall 312 and extends from the third sidewall 314. In at least one embodiment, the wall 332 is parallel to the first sidewall 312. The wall 332 is perpendicular to the third sidewall 314. The wall 332 defines a position aperture 3311 corresponding to position hole 291 of the position body 29, for coupling the main portion 31 to the main body 21.

The second sidewall 313, the third sidewall 314 and the wall 332 collective define a groove 34 in bottoms thereof and remote from the first ceiling 311. The groove 34 is configured to couple with the rib 293 of the position body 29 to couple the third sidewall 314 to the position body 29 without gap between the third sidewall 314 and the position body 29.

Figure 6:
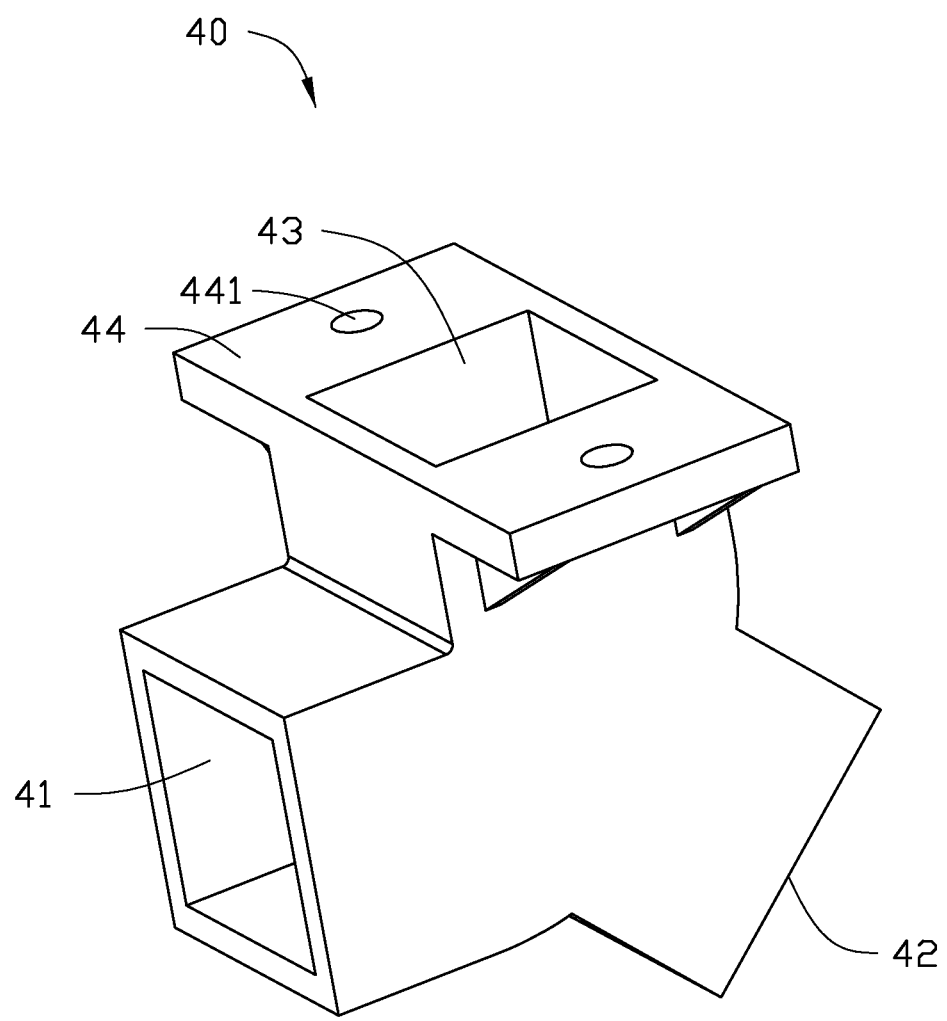
FIG. 6 is an isometric view of a heat dissipating duct of the optical engine in FIG. 2.

The heat dissipating duct 40, as shown in FIG. 6, can include a first duct 41, a second duct 42 and a third duct 43. The first duct 41, the second duct 42 and the third duct 43 are communicating with each other. The first duct 41 is substantially perpendicular to the third duct 43. The second duct 42 is slantwise relatively to the first duct 41 and the third duct 43. The second duct 42 is configured to be received in the second opening 3142 of the third sidewall 314. The third duct 43 is configured to dissipate heat from the light source 12. The third duct 43 includes two position blocks 44. Each position block 44 defines a hole 441 configured to match with a fastener to couple the heat dissipating duct 40 to the shell 11 of the light source device 10.

The optical engine 100 can further include a fan coupled to the second duct 42 and configured to provide cool airflow into the heat dissipating duct 40. The fan can be a turbofan. When in use, the fan can provide cool airflow to enter into the heat dissipating duct 40 via the second duct 42, the airflow flows to the first duct 41 and the third duct 43 and enters into the light source device 10 and the dust cover 30 to cool the light source device 10 and the color wheel 22.

In an assembly of the optical engine 100, the light filter 27 is coupled into the first opening 3141 of the third sidewall 314 of the main portion 31 of the dust cover 30. The dust cover 30 is coupled to the main body 21 of the engine body 20. The rib 293 of the position body 29 of the engine body 20 is coupled into the groove 34 of the main portion 31 of the dust cover 30. Fasteners are coupled into the position hole 291 of the of the position body 29, the position aperture 3311 of the locating part 33 and the locating aperture 3251 of the locating block 325 of the dust cover 30. The third sidewall 314 of the dust cover 30 faces the light source device 10. The first ceiling 311 and the fourth sidewall 315 of the main portion 31 covers the color wheel 22. The extension portion 32 of the dust cover 30 covers the light channel 23. The color wheel 22 is received in the receiving space 316 of the main portion 31 and is surrounded by the first ceiling 311, the fourth sidewall 315 and the main body 21. The light channel 23 is received in the receiving room 326 of the extension portion 32 of the dust cover 30 and is surrounded by the extension portion 32 and the main body 21. In at least one embodiment, the color wheel 22 and the light channel 23 are sealed by the engine body 20 and the dust cover 30.

The light source device 10 is coupled to the third sidewall 314 of the dust cover 30. The first opening 3141 and the light filter 27 are in the light path of the white light beam form the light source device 10.

The heat dissipating duct 40 is coupled between the light source device 10 and the dust cover 30. The first duct 41 of the heat dissipating duct 40 is coupled to the second opening 3142 of the third sidewall 314 of the main portion 31 of the dust cover 30. The third duct 43 is coupled to the heat dissipation window of the light source device 10. Fasteners are coupled to the apertures 441 of the position blocks 44 of the third duct 43 and the shell 11.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical engine comprising:
a light source device configured to emit light beam;
an engine body located at a side of the light source device and configured to receive the light beam from the light source device, the engine body comprising a main body and a color wheel coupled to the main body; and
a dust cover coupled to the engine body and covering the color wheel; and
a heat dissipating duct positioned between, and directly coupled to, the light source and the dust cover;
wherein, the dust cover comprises a main portion and an extension portion extending from the main portion, the main portion covering the color wheel, the main portion of the dust cover comprises a first ceiling and two sidewalls extending from the first ceiling, one of the two sidewalls, the ceiling and the main body surrounding the color wheel, the extension portion of the dust cover extends from one of the two sidewalls, the extension portion defining a receiving room receiving the light channel therein, the engine body further comprises a position body coupled to the main body, the other of the two sidewalls of the main portion of the dust cover being coupled to the position body, the other of the two sidewalls of the main portion of the dust cover defines a first opening receiving a light filter, the light filter being on a light path of a light beam from the light source device, the other of the two sidewalls of the main portion of the dust cover defines a second opening, the heat dissipating duct being coupled to second opening.

2. The optical engine of claim 1, wherein the color wheel is surrounded by the main portion of the dust cover and the main body of the engine body.

3. The optical engine of claim 1, wherein the engine body further comprises a light channel coupled to the main body and located on a light path of lights from the color wheel.

4. The optical engine of claim 3, wherein the extension portion covers the light channel.

5. The optical engine of claim 4, wherein the light channel is surrounded by the extension portion and the main body.

6. The optical engine of claim 1, wherein the other of the two sidewalls of the main portion of the dust cover defines a groove, the position body of the engine body comprising a rib coupled into the groove.

7. The optical engine of claim 1, wherein the heat dissipating duct comprises a first duct and a second duct communicating with the first duct, the first duct being coupled to the second opening.

8. The optical engine of claim 1, wherein the heat dissipating duct comprises a third duct communicating with the second duct, the third duct being coupled to the light source device and configured to dissipate heat generated by the light source device.

9. A projector comprising:
a light source device configured to emit light beam;
an engine body configured to receive the light beam form the light source device and comprising a main body, a color wheel coupled to the main body and a light channel coupled to the main body and adjacent the color wheel; and a dust cover coupled to the engine body and covering the color wheel and the light channel; and a heat dissipating duct positioned between, and directly coupled to, the light source and the dust cover;

wherein, the dust cover comprises a main portion and an extension portion extending from the main portion, the main portion covering the color wheel, the extension portion covering the light channel, the main portion of the dust cover comprises a first ceiling and two sidewalls extending from the first ceiling, one of the two sidewalls, the ceiling and the main body surrounding the color wheel, the other of the two sidewalls of the main portion of the dust cover defines a second opening, the heat dissipating duct being coupled to second opening.

10. The projector of claim 4, wherein the color wheel is surrounded by the main portion and the main body.

11. The projector of claim 4, wherein the light channel is surrounded by the extension portion and the main body.

12. The projector of claim 1, wherein the extension portion of the dust cover extends from the one of the two sidewalls, the extension portion defining a receiving room receiving the light channel therein.

\* \* \* \* \*